May 12, 1970   J. E. JOHANSON   3,512,059
ADJUSTABLE LOW-LOSS CAPACITOR
Original Filed Sept. 5, 1967
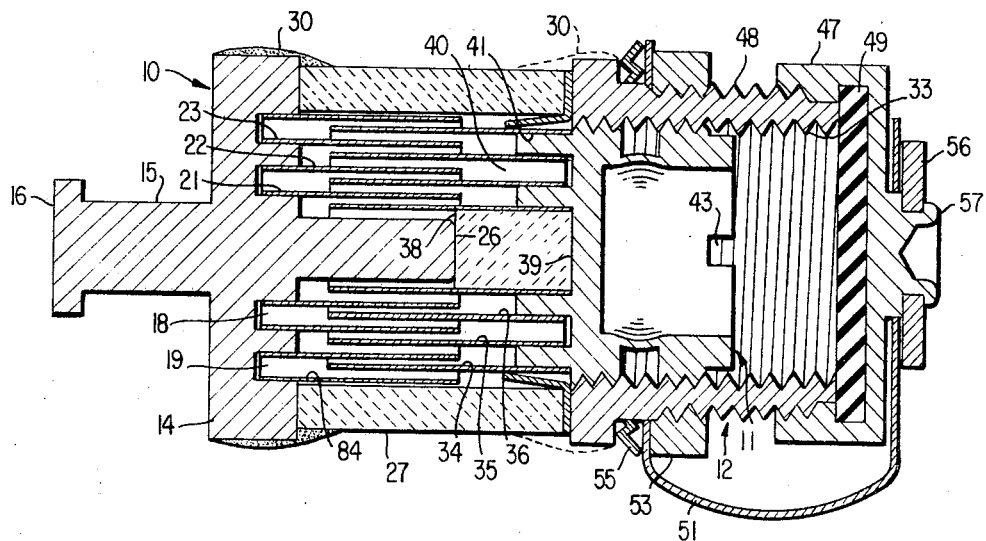
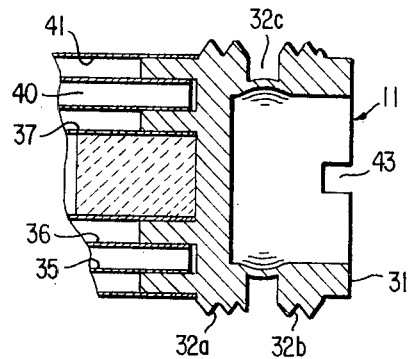
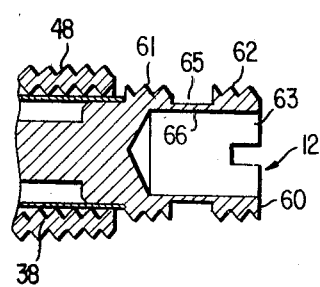
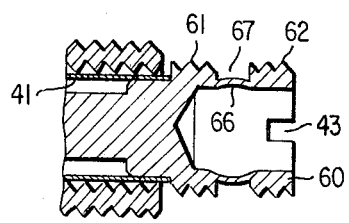
INVENTOR
JOHN E. JOHANSON
BY *James J. Cannon*
ATTORNEY United States Patent Office 3,512,059
Patented May 12, 1970

3,512,059
ADJUSTABLE LOW-LOSS CAPACITOR
John E. Johanson, Boonton, N.J., assignor to Johanson Manufacturing Corporation, Boonton, N.J.
Original application Sept. 5, 1967, Ser. No. 665,527. Divided and this application Sept. 13, 1968, Ser. No. 785,410
Int. Cl. H01g 5/12
U.S. Cl. 317—249
4 Claims

ABSTRACT OF THE DISCLOSURE

A low-loss capacitor having hollow cylindrical electrodes which are coaxially interleaved. The capacitance is varied by rotation of the rotor electrodes which are mounted on a screw member for axial displacement with respect to the stator electrodes when the screw member is turned. The screw member has a frictional locking means in the form of an outwardly resiliently bulging thin-walled section of reduced diameter and is located between two series of threads.

---

This application is a division of Ser. No. 665,527, Group 215, filed Sept. 5, 1967, which was a continuation-in-part of Ser. No. 558,150 filed June 16, 1966, now abandoned, which in turn was a continuation-in-part of Ser. No. 510,148 filed Nov. 18, 1965, now abandoned.

The present invention relates to adjustable capacitors and more particularly to low loss capacitors having an improved frictionally locked adjustment screw.

The capacitors are used for tuning or as trimmers and have maximum capacitances of the order of from 5 to 500 micro microfarads. The minimum capacitance for the range of adjustability is usually less than ten percent of the maximum capacitance. The capacitance varies linearly with respect to angular displacement of the adjustment screw with a high degree of precision throughout the adjustment range. Extremely low losses are obtained, the "Q" being of the order of 1000 to 4000 at a frequency of 100 megacycles per second. The variation of capacitance with respect to operating temperature is low.

The capacitor comprises a stator unit and a rotor unit each having a series of coaxially arranged cylindrical electrode tubes. The stator unit is rigidly connected by a hollow cylindrical insulating member with an interiorly threaded rotor bushing. The rotor unit comprises a rotor screw which engages the internal threads of the rotor bushing with a precision fit. One end of the rotor screw carries an axially displaceable group of rotor tubes which enter between and are spaced from the stator tubes. The outer end of the rotor screw is formed with a screwdriver slot for turning the rotor unit.

In this embodiment, the non-threaded portion of the rotor screw is formed to define a resiliently deformable thin-walled portion intermediate its ends. The screw is initially continuously threaded throughout its length and is provided with a smooth internal axial bore. A portion of the threaded outer portion is then cut away to form an annular groove the bottom of which defines the outer surface of the thin-walled portion. A bulge of increased diameter is then formed in the thin-walled portion by a suitable tool inserted in the axial bore. The formation of the bulge draws the two threaded portions between which it lies axially closer together, whereby the threads of the two threaded portions become helically misaligned. Upon insertion of the screw into the rotor bushing, the two threaded portions are yieldingly forced into helical alignment by an accompanying elongation of the outwardly bulging thin-walled portion to produce frictional engagement between the continuous internal threads and the interrupted external threads of the rotor screw.

The invention will be better understood from the following specification with reference to the accompanying drawing forming a part thereof.

Referring to the drawing:

FIG. 1 is an elevational view in avial section showing a capacitor embodying the invention and having an adjustment screw wherein the non-threaded portion is omitted.

FIG. 2 is a fragmentary view in axial section illustrating the convergent configuration of the bulge in the non-threaded portion of the screw of the rotor unit when the screw is removed from engagement with the cooperating internal threads shown in FIG. 1.

FIG. 3 is a view in axial section on a reduced scale showing a modified form of rotor screw having a thin-walled section intermediate its ends.

FIG. 4 is a view similar to FIG. 3 showing the thin-walled section after a bulge has been imparted thereto for helical misalignment of the threads of the two threaded portions.

Referring to the drawing, the capacitor comprises a stator unit designated generally as 10 and a rotor unit designated generally as 11. The rotor unit 11 is threadedly mounted in a rotor bushing member designated generally as 12.

The stator unit 10 comprises a metal disc-shaped body portion 14 having an external integrally formed axial extension 15. The free end of the extension 15 is headed at 16 for retaining a conductor (not shown) prior to and during the formation of a soldered connection with the conductor. The conductor, or other circuit element which is connected to the extension 15, provides a utilization connection for energizing the stator unit 10.

The stator unit 10 has an inner annular groove 18 formed therein and an outer annular groove 19, the two grooves 18 and 19 being of rectangular cross-section and precisely concentric with the common longitudinal axis of the stator unit 10 and rotor bushing 12. Four stator tubes 21, 22, 23 and 24 are precision fitted in the grooves 18 and 19 and are of equal lengths. The stator tubes 21–24 are permanently secured by the soldering. The stator tubes 21–24 are formed of invar or similar alloy when a low temperature coefficient of capacitance is desired. Where very low loss is important, the electrode tubes are made of silver or other material of low specific resistivity. An integrally formed cylindrical shank 26 extends from the body portion 14 of stator unit 10 coaxially within the innermost stator tube 21.

The stator unit 10 is rigidly connected to the rotor bushing 12 by a hollow cylindrical housing or sleeve 27 formed of a glazed ceramic material such as alumina. Glass is also suitable. At its ends, the external surface of the housing 27 is metallized to provide two thin circumferential bands 28 of metal intimately and positively adhered to the surface of the sleeve. In the drawing, the thickness of the metallized bands 28 has been exaggerated for clarity of illustration. The metallized bands 28 are connected to the periphery of the stator unit 10 and to the periphery of the rotor bushing 12 by rings of high melting point solder 30. During the soldering operation, the parts are so positioned that the longitudinal axes of the stator unit 10 and the rotor bushing 12 are precisely aligned.

The rotor unit 11 comprises a metal body portion 31 having two axially spaced series or groups of external helical threads 32a and 32b in threaded engagement with complementary internal threads 33 formed in the rotor bushing 12. The threads 32a and 32b constitute two axially spaced threaded sections or groups of threads which are separated by a non-threaded section 32c of reduced diameter. In FIG. 4, the non-threaded portion 32c has been omitted. The rotor unit 11 also comprises four rotor tubes 34, 35, 36 and 37 of equal lengths formed of metal like the stator tubes 21–24 described above. Inward movement of the rotor unit 11 is limited by a stop member 38 suitably retained with the innermost rotor tube 37 and which abuts the stop in the position of maximum capacitance. The innermost tube 34 is press fitted or otherwise permanently and accurately secured being fitted against the lateral wall of a cylindrical recess 39 formed in the inner end of the rotor body 31. The intermediate tubes 35 and 36 are similarly fitted against the inner and outer walls, respectively, of an annular groove 40 formed in the end of the rotor body 31, the depth of the groove 40 being the same as that of the recess 39. The outermost tube 37 is similarly fitted against a cylindrical outer end surface 41 of the rotor body 31. For lower values of maximum capacitance the number of rotor tubes may be reduced to a single tube.

Each of the four rotor tubes 34–37 extends to an adjustable extent within and overlies one of the four stator tubes 21–24 and with substantially uniform radial spacing, the external surface of the stator shank 26 operating as an innermost stator electrode cooperating with the innermost rotor tube 34.

The rotor tubes 34–37 may be moved axially with respect to the stator tubes 21–24 by turning the rotor unit 11 using a screwdriver (not shown) inserted in a screwdriver slot 43 formed in the outer end of the rotor body 31.

The capacitor is shown provided with an end closure cap 47 threadedly engaging external threads 48 formed on the rotor bushing 12. An airtight seal is provided by a sealing disc 49 formed of resilient material. A retaining strap 51 formed of flexible material interconnects the cap 47 and the rotor bushing 12, so that the cap 47 will not become misplaced during its removal for capacitance adjustment.

The capacitor is shown mounted in a metal panel 52 being retained by a nut 53 cooperating with a lock washer 55. One end of the retaining strap 51 is fixedly held between the nut 53 and lock washer 55. The other end of the retaining strap 51 is freely rotatably connected to the cap 47, being loosely held by a washer 56 which is secured to the cap 47 by riveting over a central projecting portion of the cap 47 as indicated at 57.

Referring to FIGS. 3 and 4, the rotor bushing 12 is arranged as described above with respect to FIGS. 1 through 4. The body portion 60 of rotor unit 11 is shown provided with two axially spaced series of external helical threads 61 and 62 for engagement with the internal threads 38 of bushing 12. A screwdriver slot 43 at the outer end of the rotor body 60 permits rotation of the rotor unit 31 for capacitance adjustment.

The threads 61 and 62 are originally formed as continuous threads and are precision machined for engagement with the internal threads 33 of bushing 12. A blind axial bore 63 extends inwardly from the outer end of the body portion 60. The body portion 60 is then machined to form a circumferentially extending non-threaded annular groove 65 which lies intermediate the two series of threads 61 and 62.

The bottom of the groove 65 and the axial bore 63 define a thin-walled portion 66 of body portion 60 which is initially cylindrically shaped as shown in FIG. 3. By means of a suitable spinning or forming operation, the thin-walled portion 66 is caused to assume an outwardly convex bulge 67 having the general shape of an equatorial zone of a sphere as shown in FIG. 4. The formation of the bulge 67 in the thin-walled portion 66 as shown in FIG. 6 brings the two series of threads 61 and 62 axially closer together than they were at the time of their cutting as a single continuous thread or immediately after the formation of the annular groove 65 as shown in FIG. 5. The threads 61 and 62 are thus resiliently helically misaligned. When threaded into the bushing 12, the threads 61 and 62 are axially forcibly urged apart by the internal threads 38 toward their initial spacing shown in FIG. 5.

The bulge 67 of thin-walled portion 66 is resiliently deformable, to a certain extent, toward the initial cylindrical configuration for wall 66 illustrated in FIG. 3. Accordingly, the axially spaced threaded sections 61 and 62 are yieldingly urged toward each other by the bulge 67 and the resulting frictional forces effectively lock the rotor body 60 in any desired position in the bushing 12 to which it is adjusted by a screwdriver inserted in the slot 43.

While I have shown and described what I believe to be the best embodiments of my invention, it will be apparent to those skilled in the art that various changes and modifications may be made therein without departing from the spirit and scope of the invention as defined in the appended claims.

What is claimed is:

1. An adjustable capacitor comprising a rotor portion and a stator portion, relative axial displacement between said rotor portion and said stator portion causing a variation in the capacitance of said capacitor; an interiorly threaded member mechanically connected to one of said capacitor portions and an exteriorly threaded member mechanically connected to the other capacitor portion, the threads of said interiorly threaded member being in cooperating engagement with the threads of said exteriorly threaded member for defining the axis of said axial displacement, said exteriorly threaded member having an axial bore and an annular groove formed therein, said groove defining, with said bore, a thin-walled portion of said exteriorly threaded member located intermediate two separate axially spaced threaded portions thereof, said thin-walled portion having a resiliently deformable bulging configuration which yieldingly helically misaligns said separate threaded portions when free from engagement with any cooperating threads, said threads being forcibly aligned by the threads of said interiorly threaded member when in engagement therewith to produce a continuous frictional engagement between said threaded members for resisting relative rotation therebetween.

2. In an adjustable capacitor according to claim 1 wherein said bulging configuration is shaped substantially as an equatorial zone of a sphere.

3. In an adjustable capacitor according to claim 1 having an elongated exteriorly threaded adjustment screw having a uniform pitch throughout the threaded portion thereof, said screw having an axial bore and at least one annular groove formed therein which extends inwardly toward said bore, the threads of said screw being interrupted by said groove, said bore and said groove defining a thin-walled portion of said screw located intermediate axially spaced threaded portions thereof, said thin-walled portion having a resiliently deformable bulging configuration which, with the threads of said screw free from any cooperating threads, maintains said axially portions of said screw threads helically misaligned, said spaced portions of said threads becoming yieldingly aligned by axial elongation of said screw accompanying simultaneous engagement of said spaced portions of said screw threads with cooperating internal threads, said elongation producing spring-pressed frictional engagement between said spaced portions of said screw threads and said cooperating threads.

4. A capacitor according to claim 3, wherein said bulging configuration is shaped substantially as an equatorial zone of a sphere.

References Cited

UNITED STATES PATENTS 3,302,150   1/1967   Lyman.

ELLIOT A. GOLDBERG, Primary Examiner

U.S. Cl. X.R.

317—251